(12) United States Patent
Oh et al.

(10) Patent No.: US 10,635,222 B2
(45) Date of Patent: Apr. 28, 2020

(54) TOUCH PAD AND ELECTRONIC APPARATUS USING THE SAME, AND METHOD OF PRODUCING TOUCH PAD

(71) Applicant: Samsung Electronics Co., Ltd., Suwon-si, Gyeonggi-do (KR)

(72) Inventors: Seung-jin Oh, Seoul (KR); Sang-ho Kim, Hwaseong-si (KR); Byung-hoon Kang, Suwon-si (KR); Sang-wook Kwon, Seongnam-si (KR); Byung-jik Kim, Seongnam-si (KR); Chang-byung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 15/277,282

(22) Filed: Sep. 27, 2016

(65) Prior Publication Data

US 2017/0097718 A1 Apr. 6, 2017

Related U.S. Application Data

(60) Provisional application No. 62/236,535, filed on Oct. 2, 2015.

(30) Foreign Application Priority Data

Mar. 9, 2016 (KR) .................. 10-2016-0028475

(51) Int. Cl.
*G06F 3/041* (2006.01)
(52) U.S. Cl.
CPC .......... *G06F 3/0416* (2013.01); *G06F 3/0414* (2013.01); *G06F 2203/04103* (2013.01); *G06F 2203/04105* (2013.01)

(58) Field of Classification Search
CPC ............... G06F 3/0416; G06F 3/0414; G06F 2203/04103; G06F 2203/04105
See application file for complete search history.

(56) References Cited

U.S. PATENT DOCUMENTS

| | | | |
|---|---|---|---|
| 8,575,823 B2 | 11/2013 | Nishikubo | |
| 9,200,970 B2 | 12/2015 | Kodani et al. | |
| 9,297,831 B2 | 3/2016 | Ahn et al. | |

(Continued)

FOREIGN PATENT DOCUMENTS

| JP | 2015-162153 A | 9/2015 |
|---|---|---|
| KR | 10-0766627 B1 | 10/2007 |

(Continued)

OTHER PUBLICATIONS

Satoshi Tsuji et al.; "A Layered 3D Touch Screen Using Capacitance Measurement"; IEEE Sensors Journal, vol. 14, No. 9, Sep. 2014.

(Continued)

*Primary Examiner* — Ricardo Osorio
(74) *Attorney, Agent, or Firm* — Jefferson IP Law, LLP

(57) ABSTRACT

A touch pad is provided. The touch pad includes a transparent piezoelectric film layer configured to generate an electrical signal varying according to a touch pressure, and an electrode layer including a plurality of transparent electrodes disposed in a plurality of areas of the transparent piezoelectric film layer and configured to sense a voltage of the electrical signal generated from the plurality of areas.

19 Claims, 15 Drawing Sheets

(56) References Cited

U.S. PATENT DOCUMENTS

| | | | |
|---|---|---|---|
| 9,671,865 B2* | 6/2017 | Modarres | G06F 3/016 |
| 9,818,928 B2* | 11/2017 | Park | H01L 41/0825 |
| 9,898,139 B2 | 2/2018 | Lee et al. | |
| 2009/0002199 A1* | 1/2009 | Lainonen | G06F 3/0414 |
| | | | 341/20 |
| 2009/0322496 A1 | 12/2009 | Da Costa | |
| 2011/0043454 A1* | 2/2011 | Modarres | B06B 1/0629 |
| | | | 345/173 |
| 2011/0187674 A1 | 8/2011 | Baker et al. | |
| 2011/0261021 A1* | 10/2011 | Modarres | G06F 3/016 |
| | | | 345/177 |
| 2012/0019449 A1 | 1/2012 | Yilmaz et al. | |
| 2012/0086651 A1* | 4/2012 | Kwon | G06F 3/016 |
| | | | 345/173 |
| 2012/0092284 A1 | 4/2012 | Rofougaran et al. | |
| 2013/0027339 A1 | 1/2013 | Kodani et al. | |
| 2013/0082970 A1* | 4/2013 | Frey | G06F 3/0414 |
| | | | 345/173 |
| 2013/0155005 A1 | 6/2013 | Liang | |
| 2013/0285970 A1 | 10/2013 | Ahn et al. | |
| 2014/0055394 A1* | 2/2014 | Park | H01L 41/0825 |
| | | | 345/173 |
| 2014/0060210 A1 | 3/2014 | Jeon et al. | |
| 2014/0152618 A1 | 6/2014 | Ando | |
| 2014/0152623 A1 | 6/2014 | Lee et al. | |
| 2014/0210313 A1 | 7/2014 | Kim et al. | |
| 2014/0247227 A1* | 9/2014 | Jiang | G06F 3/016 |
| | | | 345/173 |
| 2014/0362304 A1* | 12/2014 | Wang | G06F 3/0412 |
| | | | 349/12 |
| 2015/0122625 A1 | 5/2015 | Seo | |
| 2015/0154885 A1* | 6/2015 | Livermore-Clifford | |
| | | | G09B 5/00 |
| | | | 434/114 |
| 2015/0165479 A1* | 6/2015 | Lasiter | B06B 1/0666 |
| | | | 310/322 |
| 2015/0331517 A1* | 11/2015 | Filiz | G06F 3/0414 |
| | | | 345/173 |
| 2015/0339001 A1 | 11/2015 | Zirkl et al. | |
| 2016/0018893 A1 | 1/2016 | Choi et al. | |
| 2016/0054835 A1 | 2/2016 | Heo et al. | |
| 2016/0224182 A1* | 8/2016 | Kano | G06F 3/0414 |
| 2016/0231857 A1* | 8/2016 | Kano | G06F 3/0488 |
| 2016/0299606 A1 | 10/2016 | Go | |
| 2017/0371461 A1* | 12/2017 | Lee | G06K 9/00 |

FOREIGN PATENT DOCUMENTS

| | | |
|---|---|---|
| KR | 10-2011-0105455 A | 9/2011 |
| KR | 10-1109226 B1 | 1/2012 |
| KR | 10-2012-0073140 A | 7/2012 |
| KR | 10-2013-0005297 A | 1/2013 |
| KR | 10-2013-0045222 A | 5/2013 |
| KR | 10-2013-0085201 A | 7/2013 |
| KR | 10-2013-0116167 A | 10/2013 |
| KR | 10-2014-0032093 A | 3/2014 |
| KR | 10-2014-0070150 A | 6/2014 |
| KR | 10-2014-0096644 A | 8/2014 |
| KR | 10-1457336 B1 | 11/2014 |
| KR | 10-2015-0032028 A | 3/2015 |
| KR | 10-2015-0047506 A | 5/2015 |
| KR | 10-2015-0052554 A | 5/2015 |
| KR | 10-1526043 B1 | 5/2015 |
| KR | 10-2015-0080480 A | 7/2015 |
| WO | 99/38149 A1 | 7/1999 |
| WO | 2015/077200 A1 | 5/2015 |

OTHER PUBLICATIONS

Yingzhe Hu et al.; 3D Gesture-Sensing System for Interactive Displays Based on Extended-Range Capacitive Sensing ISSCC 2014 / Session 12 / Sensors, MEMS, and Displays / 12.2; Princeton University, Princeton, NJ.

Li Du et al.; "A 2.3mW 11cm-Range Bootstrapped and Correlated-Double-Sampling (BCDS) 3D Touch Sensor for Mobile Devices"; ISSCC 2015 / Session 6 / Image Sensors and Displays / 6.7; University of California, Los Angeles, CA.

Yan Zhang et al.; "3D Sensor for High Resolution Touch Panel Using Bootstrapped Oscillator-Based Self-Capacitance Sensing"; https://escholarship.org/uc/item/363614nd.

Mathieu Le Goc et al.; "A Low-cost Transparent Electric Field Sensor for 3D Interaction on Mobile Devices"; Proceedings of the 2014 Annual Conference on Human Factors in Computing Systems (CHI 2014), Apr. 2014, Toronto, Canada; HAL ID: hal-00973234; https://hal.inria.fr/hal-00973234.

Margarita Grinvald; "Gesture recognition for Smartphones/Wearables".

USPTO office action dated Aug. 5, 2019; U.S. Appl. No. 15/764,590.

* cited by examiner

TOUCH PAD AND ELECTRONIC APPARATUS USING THE SAME, AND METHOD OF PRODUCING TOUCH PAD

CROSS-REFERENCE TO RELATED APPLICATION(S)

This application claims the benefit under 35 U.S.C. § 119(e) of a U.S. Provisional application filed on Oct. 2, 2015 in the U.S. Patent and Trademark Office and assigned Ser. No. 62/236,535, and under 35 U.S.C. § 119(a) of a Korean patent application filed on Mar. 9, 2016 in the Korean Intellectual Property Office and assigned Serial number 10-2016-0028475, the entire disclosure of which is hereby incorporated by reference.

TECHNICAL FIELD

The present disclosure relates to a touch pad, a touch screen and an electronic apparatus using the same, and a method of producing the touch pad. More particularly, the present disclosure relates to a touch pad using a piezoelectric element, a touch screen and an electronic apparatus using the same, and a method of producing the touch pad.

BACKGROUND

A contact sensing apparatus, such as a touch pad, is an input apparatus that may be included in an electronic apparatus to provide an input method using a body of a user without additional devices such as a mouse, a keyboard, or the like. Contact sensing apparatuses have been widely applied to portable electronic devices that may not use an additional input devices.

In addition, the contact sensing apparatus has been widely applied to various types of electronic devices such as a touch screen, a smartphone, a personal digital assistant (PDA), a navigation system, etc., where a touch screen may be generally understood to be an input device attached onto a display panel to provide an intuitive input method to a user. In particular, a recent increase in demands for smartphones has increased the number of devices using a touch screen as a contact sensing apparatus capable of providing various types of input methods in a limited form factor.

Further, the contact sensing apparatuses applied to portable electronic devices may be generally classified into a resistive type, a capacitive type, an infrared (IR) type, and a surface acoustic wave (SAW) type according to methods of sensing a touch input.

Moreover, consumer demands have increased for input methods different from the capacitive type input method representatively used in many existing portable electronic devices. Therefore, there is a need for technologies that are more touch sensitive and recognize the strength and types of various touches.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a touch pad capable of differentiating and recognizing strengths of touches by using a piezoelectric element and generating vibrations in a touched area, a touch screen and an electronic apparatus using the same, and a method of producing the touch pad.

In accordance with an aspect of the present disclosure, a touch pad is provided. The touch pad includes a transparent piezoelectric film layer configured to generate an electrical signal varying according to a touch pressure, and an electrode layer including a plurality of transparent electrodes disposed in a plurality of areas of the transparent piezoelectric film layer and configured to sense a voltage of an electrical signal generated from the plurality of areas.

In accordance with another aspect of the present disclosure, an electronic apparatus is provided. The electronic apparatus includes a touch screen including a display panel configured to display a screen, a touch pad disposed on the display panel. The touch pad includes a transparent piezoelectric film layer configured to generate an electrical signal varying according to a touch pressure and an electrode layer including a plurality of electrodes disposed in a plurality of area of the transparent piezoelectric film layer so as to sense a voltage of an electrical signal generated from the plurality of areas. The electronic apparatus further includes a window cover disposed on the touch pad and a processor configured to determine a location to which the touch pressure is applied, based on the voltage sensed through the plurality of transparent electrodes.

In accordance with another aspect of the present disclosure, a method of producing a touch pad is provided. The method includes providing a transparent piezoelectric film layer configured to generate a voltage varying according to a touch pressure, and forming an electrode layer including a plurality of transparent electrodes in a plurality of areas of the transparent piezoelectric film layer so as to sense a voltage in each of the plurality of areas.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWING

The above and/or other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "first", "second", etc., may modify various types of elements, but these elements are not restricted by the terms. The terms may be used to distinguish one element from another element.

In the present application, the terms "include" and "comprise" designate the presence of features, numbers, operations, components, elements, or a combination thereof that are written in the specification, but do not exclude the presence or possibility of addition of one or more other features, numbers, operations, components, elements, or a combination thereof.

Hereinafter, the present disclosure will be described in more detail with reference to the attached drawings.

Figure 1:
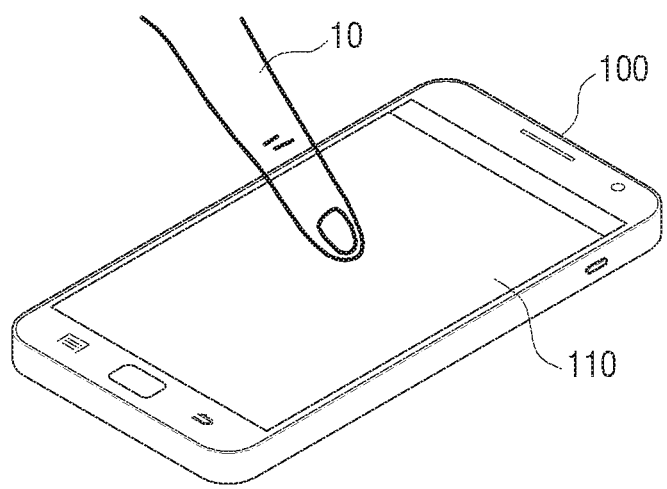
FIG. 1 illustrates an electronic apparatus including a touch screen using a touch pad according to an embodiment of the present disclosure.

FIG. 1 illustrates an electronic apparatus including a touch screen using a touch pad according to an embodiment of the present disclosure.

Referring to FIG. 1, an electronic apparatus 100 includes the touch screen 110 using the touch pad, according to the present embodiment. The electronic apparatus 100 may perform a command by sensing a touch performed by a finger 10 of a user. In detail, the electronic apparatus 100 may discriminate a strength of the touch performed by the finger 10 of the user and perform a different command according to the discriminated strength of the touch.

The electronic apparatus 100 may generate vibrations in a touched area according to a feedback on the touch performed by the finger 10 of the user.

Merely the touch screen 110 including a display panel has been illustrated and described in FIG. 1, but the touch screen may be realized as a touch pad type not including a display panel.

The electronic apparatus 100 according to the present embodiment may be a smartphone, but this is merely an embodiment. Therefore, the electronic apparatus 100 may be realized as various types of electronic apparatuses such as a foldable smartphone, a notebook computer, a desktop personal computer (PC), a tablet PC, a smart television (TV), and the like.

Figure 2:
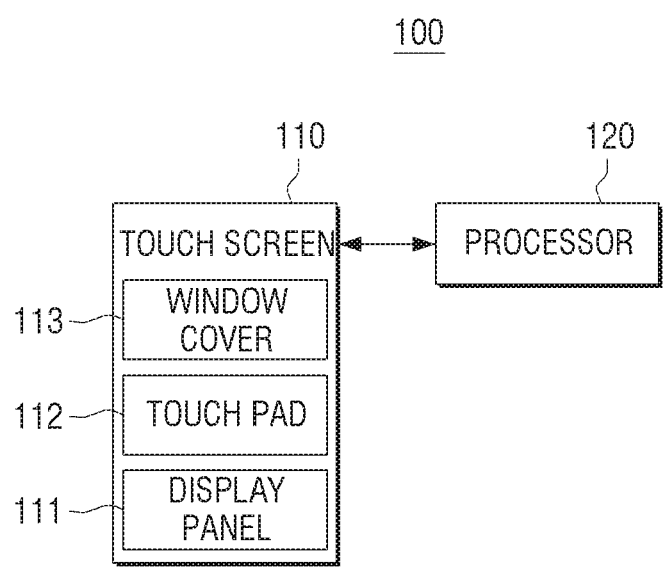
FIG. 2 is a block diagram of a schematic configuration of the electronic apparatus of FIG. 1 according to an embodiment of the present disclosure.

FIG. 2 is a block diagram of a schematic configuration of an electronic apparatus of FIG. 1 according to an embodiment of the present disclosure.

Referring to FIG. 2, the electronic apparatus 100 includes the touch screen 110 and a processor 120. Although not shown above for convenience of description, the electronic apparatus 100 may be realized to include various types of elements such as a storage unit, a transmitter and receiver, an audio output unit, and the like.

The touch screen 110 may receive a touch input from the user, and perform and display an operation according to the touch input. Here, the touch screen 110 may include a display panel 111, a touch pad 112, and a window cover 113. In detail, the touch screen 110 includes the display panel 111, the touch pad 112, and the window cover 113. In more detail, the touch screen 110 includes the display panel 111 displaying a screen and the touch pad 112 is disposed on the display panel 111. The touch pad 112 may include a transparent piezoelectric film layer and a transparent electrode capable of transmitting light of the display panel 111. Therefore, the touch pad 112 may be disposed on the display panel 111 not underneath the display panel 111 so as to enable the user to press the screen of the display panel 111 while directly viewing the screen.

The display panel 111 may display multimedia content, an image, a moving image, a text, and the like. The display panel 111 may be one selected from a liquid crystal display (LCD) panel, a plasma display panel (PDP), an organic light-emitting diode (OLED), a vacuum fluorescent display (VFD), a field emission display (FED), and an electroluminescence display (ELD).

Although not shown, the touch pad 112 may include a piezoelectric film layer that generates a voltage due to touch pressure. In detail, the touch pad 112 may include a piezoelectric film layer that generates a voltage having a level varying according to the touch pressure. A plurality of piezoelectric film layers may be included. If an electrical signal is applied through an electrode, the piezoelectric film layer may be transformed, and thus vibrations may be generated by the transformation of the piezoelectric film layer.

The piezoelectric film layer may be a transparent piezoelectric film layer that transmits light of a display panel. In detail, the transparent piezoelectric film layer forming the touch pad 112 may be at least one selected from a polylactide acid film (PLA) film and a polyvinylidene fluoride (PVDF) film.

PLA may be poly-l-lactide acid (PLLA) and poly-d-lactide (PDLA) that are two kinds of mirror image isomer formed of chiral molecules. The mirror image isomer refers to isomer including four functional groups that are located around carbon, have the same physical and chemical characteristics, and all have different asymmetrical carbons so as to become mirror images but not to overlap with one another.

The transparent piezoelectric film layer may be a plurality of transparent piezoelectric films that are stacked. A detailed structure of the transparent piezoelectric film layer formed of the stack of the plurality of transparent piezoelectric films will be described in detail later with reference to FIGS. 8 and 9.

Although not shown, the touch pad 112 may include an electrode layer disposed on the piezoelectric film layer. In detail, the touch pad 112 may include an electrode layer including a plurality of electrodes that are disposed in a plurality of areas of the transparent piezoelectric film layer to sense a voltage of an electrical signal generated from the plurality of areas. The plurality of electrodes forming the electrode layer may be connected to the processor 120 directly or through a touch integrated circuit (IC) to determine an area where a touch is performed and determine a strength of the touch based on the voltage sensed by the processor 120.

The electrode layer may sense the voltage of the areas where the plurality of electrodes are disposed and apply a voltage to the areas of the piezoelectric film layer where the plurality of electrodes are disposed. In detail, if a voltage is applied through a particular electrode of the electrode layer, a vibration corresponding to a voltage applied from an area of the piezoelectric film layer where the particular electrode is disposed may be generated. The particular electrode may be connected to the processor 120 to apply a voltage to the piezoelectric film layer under control of the processor 120.

The plurality of electrodes may be transparent electrodes transmitting the light of the display panel. In more detail, the transparent electrodes forming the touch pad 112 may be formed of poly (3,4-ethylenedioxythiophene) (PEDOT), a carbon nano tube (CNT), indium tin oxide (ITO), or graphene.

The plurality of transparent electrodes forming the electrode layer may have cell shapes or line shapes. In detail, the electrode layer may include a plurality of transparent electrodes that are disposed in a matrix form in cell shapes on the transparent piezoelectric film layer.

The electrode layer may include a plurality of transparent electrodes that are disposed in a row in line shapes on the transparent piezoelectric film layer. The touch pad 112 may include a plurality of transparent piezoelectric film layers and adhere the plurality of piezoelectric film layers, on each of which line-shaped transparent electrodes are orthogonal to one another. A structure of the touch pad 112 will be described in detail later with reference to FIGS. 3 to 5.

The window cover 113 may be disposed on an uppermost layer of the touch screen 110 to protect the display panel 111 and the touch pad 112. In detail, the window cover 113 may be formed of plastic such as polyethylene terephthalate (PET), polyethylene naphthalate (PEN), polymethylmethacrylate (PMMA), or colorless polyimide (CPI), intensified glass, and the like.

The processor 120 may control the display panel 111 included in the touch screen 110 to display a content or a screen operation corresponding to a touch sensed by the touch pad 112 included in the touch screen 110. In detail, the processor 120 may control the display panel 111 to display the content or the screen operation corresponding to the touch in an area of the touch pad 112 on which the touch is sensed.

The processor 120 may control the display panel 111 to display the content or the screen operation corresponding to the touch in the area of the touch pad 112 on which the touch is sensed, according to a strength of the sensed touch. In detail, if a voltage having a level corresponding to a magnitude of a touch pressure is generated from the touch pad 112, the processor 120 may control the display panel 111 to display a content or a screen operation corresponding to the level of the generated voltage.

The level of the voltage generated from the touch pad 112 according to the touch pressure and the content or the screen operation corresponding to the level of the generated voltage may be stored in a storage unit (not shown) included in the electronic apparatus 100 or may be set by the user. Therefore, although the user touches the same location on the touch screen 110, the electronic apparatus 100 may perform different operations according to strengths of touches.

The processor 120 may control the touch pad 112 to generate vibrations in an area of the touch pad 112 on which a touch is sensed. In detail, the processor 120 may control the touch pad 112 to apply a voltage to the area of the touch pad 112, on which the touch is sensed, so as to generate vibrations in the area to which the voltage is applied. Therefore, the electronic apparatus 100 may increase convenience of the user by providing various types of feedbacks on a touch input of the user.

Figure 3:
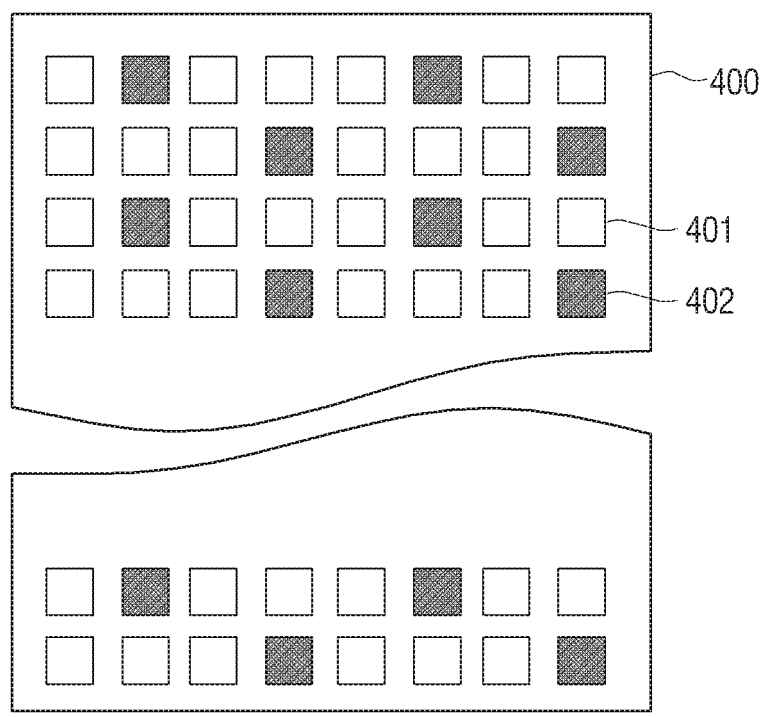
FIGS. 3 and 4 illustrate detailed configurations of a touch pad according to various embodiments of the present disclosure.
Figure 4:
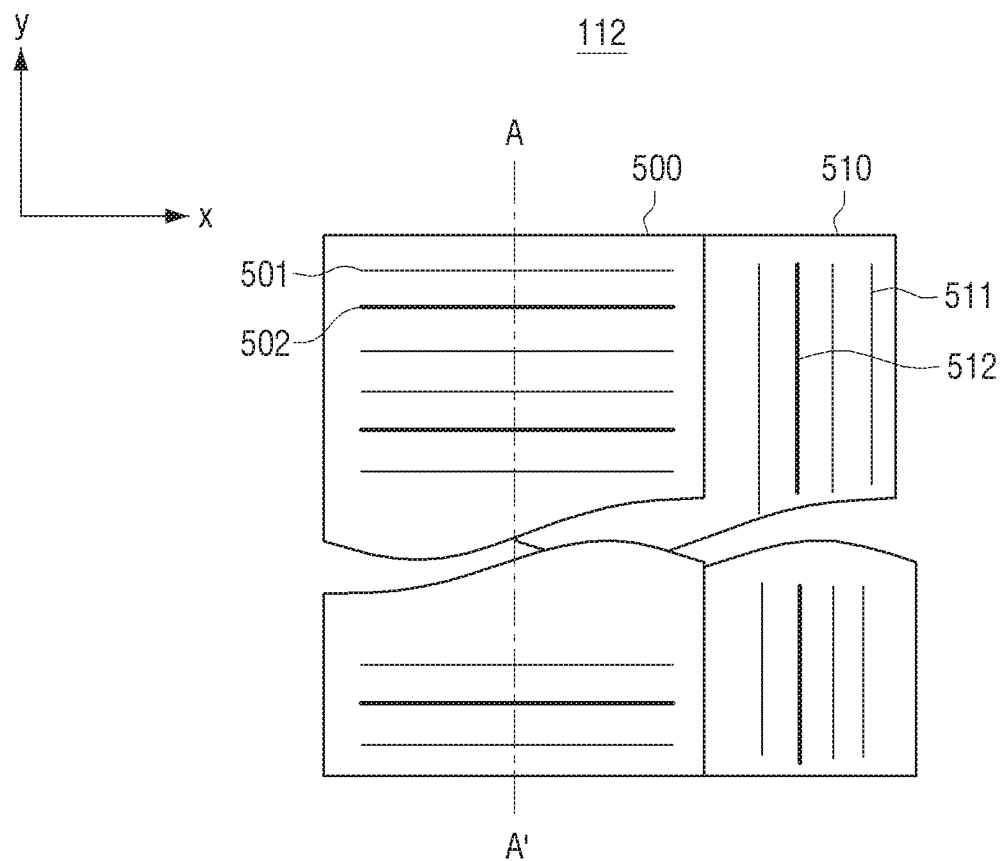

FIGS. 3 and 4 illustrate detailed configurations of a touch pad according to various embodiments of the present disclosure.

In detail, FIG. 3 illustrates a plurality of transparent electrodes that are disposed in cell shapes to form an electrode layer of the touch pad 112.

Referring to FIG. 3, the touch pad 112 according to the present embodiment includes a transparent piezoelectric film layer 400, first transparent electrodes 401 for sensing a voltage generated from the transparent piezoelectric film layer 400, and second transparent electrodes 402 for applying a voltage to the transparent piezoelectric film layer 400. The first transparent electrodes 401 and the second transparent electrodes 402 may have cell shapes. The first transparent electrodes 401 and the second transparent electrodes 402 having the cell shapes may be mixed to be arranged in a matrix form on the transparent piezoelectric film layer 400.

Locations and ratios of the first transparent electrodes 401 and the second transparent electrodes 302 shown in FIG. 3 are merely an embodiment and thus are not limited thereto. For convenience of description, as illustrated and described with reference to FIG. 3, first transparent electrodes for sensing a voltage are elements different from second transparent electrodes for applying a voltage. However, a voltage may be applied to a transparent piezoelectric film layer through the first transparent electrodes under control of a processor.

The transparent piezoelectric film layer 400 may generate an electrical signal having a voltage having a level varying according to a magnitude of a touch pressure. In detail, the transparent piezoelectric film layer 400 may be transformed by the touch pressure to generate the electrical signal. The voltage of the electrical signal may vary according to a transformed degree of the transparent piezoelectric film layer 400.

The voltage of the electrical signal generated from the transparent piezoelectric film layer 400 may be sensed through the first transparent electrodes 401 of a plurality of transparent electrodes. The first transparent electrodes 401 may be respectively connected to a processor. In detail, the processor may sense the voltage of the electrical signal generated from the transparent piezoelectric film layer 400 through the first transparent electrodes 401 so as to perform an operation corresponding to a location to which the touch pressure is applied and the magnitude of the touch pressure, based on a location of the first transparent electrode 401 from which the voltage is sensed and a level of the sensed voltage.

The processor may apply a voltage to the transparent piezoelectric film layer 400 through the second transparent electrodes 402. The second transparent electrodes 402 may be respectively connected to the processor. In detail, the second transparent electrodes 402 of the plurality of transparent electrodes may apply a voltage to the transparent piezoelectric film layer 400 so as to vibrate merely an area of the transparent piezoelectric film layer 400 to which the voltage is applied, under control of the processor. Therefore, if the user touches a touch screen, vibrations may be realized with a smaller force so as to reduce power consumption in comparison with an existing method of vibrating merely a touched area to vibrate a whole touch screen. As described above, vibrations are generated merely from an area to which a voltage is applied but may be generated from a partial or whole area of the touch screen by a touch of the user.

FIG. 4 illustrates a plurality of transparent electrodes that are disposed in line shapes to form the electrode layer of the touch pad 112 according to an embodiment of the present disclosure.

Referring to FIG. 4, the touch pad 112 according to the present embodiment includes a first transparent piezoelectric film layer 500, first transparent electrodes 501 for sensing a voltage generated from the first transparent piezoelectric film layer 500, second transparent electrodes 502 for applying a voltage to the first transparent piezoelectric film layer 500, a second transparent piezoelectric film layer 510, third transparent electrodes 511 for sensing a voltage generated from the second transparent piezoelectric film layer 510, and fourth transparent electrodes 512 for applying a voltage to the second transparent piezoelectric film layer 510. The first, second, third, and fourth transparent electrodes 501, 502, 511, and 512 may have line shapes.

A plurality of transparent electrodes 501 and 502 that are formed in line shapes on the first transparent piezoelectric film layer 500 may be orthogonal to a plurality of transparent electrodes 511 and 512 that are formed in line shapes on the second transparent piezoelectric film layer 510.

The first transparent electrodes 501 and the second transparent electrodes 502 having the line shapes may be mixed to be arranged in a row on the first transparent piezoelectric film layer 500. In detail, the first transparent electrodes 501 and the second transparent electrodes 502 that have the line shapes and extend in a horizontal direction (an x-axis direction) may be arranged in a row in up and down directions (an y-axis direction) on the first transparent piezoelectric film layer 500.

The third transparent electrodes 511 and the fourth transparent electrodes 512 having the line shapes may be mixed to be arranged in a row on the second transparent piezoelectric film layer 510. In detail, the third transparent electrodes 511 and the fourth transparent electrodes 512 that have the line shapes and extend in a vertical direction (the y-axis direction) may be arranged in a row on both sides (the x-axis direction) of the second transparent piezoelectric film layer 510.

As illustrated and described above, a first transparent piezoelectric film layer 500 on which transparent electrodes having line shapes and extending in a horizontal direction are formed is disposed on an upper part, and a second transparent piezoelectric film layer 510 on which transparent electrodes having lines and extending in a vertical direction are formed is disposed on a lower part. However, the first transparent piezoelectric film layer 500 may be located on the lower part, and the second transparent piezoelectric film layer 510 may be located on the upper part.

Locations and ratios of the first, second, third, and fourth transparent electrodes 501, 502, 511, and 512 shown in FIG. 4 are merely one embodiment and thus are not limited thereto. As illustrated and described with reference to FIG. 4 for convenience of description, first and third transparent electrodes for sensing a voltage are elements different from second and fourth transparent electrodes for applying a voltage. However, a voltage may be applied to a transparent piezoelectric film layer through the first and third transparent electrodes under control of a processor.

The first and second transparent piezoelectric film layers 500 and 510, the first and third transparent electrodes 501 and 511, and the second and fourth transparent electrodes 502 and 512 respectively perform the same operations as the transparent piezoelectric film layer 400, the first transparent electrodes 401, and the second transparent electrodes 402 of FIG. 3, and thus their detailed descriptions are omitted.

Figure 5:
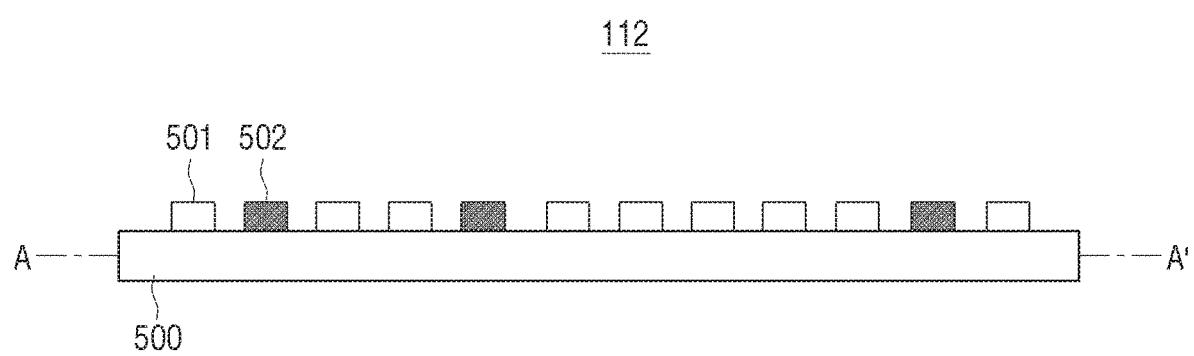
FIG. 5 is a cross-sectional view of the touch pad taken along line A-A' of FIG. 4 according to an embodiment of the present disclosure.

FIG. 5 is a cross-sectional view of the touch pad of FIG. 4 taken along line A-A' according to an embodiment of the present disclosure.

Referring to FIG. 5, a cross-sectional view of the first transparent piezoelectric film layer 500 of the touch pad 112 taken along the line A-A' of the first transparent piezoelectric film layer 500 of FIG. 4, is illustrated. The first transparent piezoelectric film layer 500 may have a shape where a plurality of transparent electrodes 501 and 502 having line shapes and extending in the x-axis direction are arranged in a row in the y-axis direction.

The first transparent electrodes 501 for sensing a voltage generated from the first transparent piezoelectric film layer 500 is mixed and arranged with the second transparent electrodes 502 for applying a voltage to the first transparent piezoelectric film layer 500 on the first transparent piezoelectric film layer 500.

If a partial area of the first transparent piezoelectric film layer 500 is transformed by a touch pressure such as a touch of the user, an electrical signal may be generated from the transformed area, and a voltage of the generated electrical signal may be sensed through a plurality of first transparent electrodes 501 located in the area from which the electrical signal is generated. An electronic apparatus may determine in which location of the touch screen a touch occurs in the y-axis direction, by sensing locations of the first transparent electrodes 501 from which the voltage is sensed.

According to the same method, although not shown, the electronic apparatus may determine in which location of the touch screen a touch occurs in the x-axis direction, by locations of a plurality of transparent electrodes for sensing a voltage on the second transparent piezoelectric film layer 510 on which a plurality of transparent electrodes having line shapes and extending in the y-axis direction are arranged in a row in the x-axis direction. Therefore, if a touch pressure such as a touch or the like occurs on a touch screen having a plurality of transparent electrodes having line shapes, the electronic apparatus may determine x, y coordinates of locations where the touch pressure occurs on the touch screen.

A level of a voltage of an electrical signal generated from the first and second transparent piezoelectric film layers 500 and 510 varies according to a magnitude of the touch pressure. Therefore, the electronic apparatus may determine the magnitude of the touch pressure, i.e., a strength of a touch, according to the level of the generated voltage.

Figure 6:
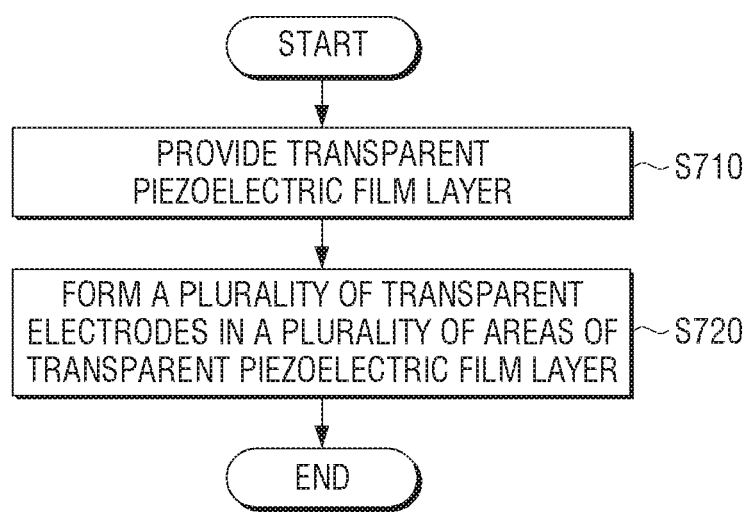
FIG. 6 is a flowchart of a method of producing a touch pad, according to an embodiment of the present disclosure.

FIG. 6 is a flowchart of a method of producing a touch pad according to an embodiment of the present disclosure.

Referring to FIG. 6, in operation S710, a transparent piezoelectric film layer is provided. The transparent piezoelectric film layer may be a transparent piezoelectric film layer that generates an electrical signal varying according to a touch pressure. The transparent piezoelectric film layer may include one or more transparent piezoelectric films. Also, the transparent piezoelectric film layer may be one or more transparent piezoelectric film layers that are provided according to shapes of electrodes that will be formed.

In operation S720, an electrode layer including a plurality of transparent electrodes may be formed in a plurality of areas of the transparent piezoelectric film layer. The plurality of transparent electrodes may sense a voltage of the electric signal generated from the transparent piezoelectric film layer. In detail, the electrode layer including the plurality of transparent electrodes may be formed by depositing an electrode layer on the transparent piezoelectric film layer, forming a pattern defining a plurality of transparent electrode areas on the deposited electrode layer, and etching an area excluding the plurality of transparent electrode areas. The electrode layer has been limitedly described as being deposited on the transparent piezoelectric film layer. However, an electrode layer on which a pattern will be formed in a form adhering to a film may be formed on the transparent piezoelectric film layer.

As described above, the electrode layer is deposited on the transparent piezoelectric film layer, and then the pattern is formed. However, the electrode layer may be formed by forming the pattern defining the plurality of transparent electrode areas on the transparent piezoelectric film layer, forming the electrode layer on the transparent piezoelectric film layer on which the pattern is formed, and etching an area excluding the plurality of transparent electrode areas.

The pattern defining the plurality of transparent electrode areas may define the plurality of transparent electrode areas so as to arrange a plurality of transparent electrodes having cell shapes in a matrix form on the transparent piezoelectric film layer or may define the plurality of transparent electrode areas so as to arrange a plurality of transparent electrodes having line shapes in a row.

In detail, the pattern defining the plurality of transparent electrode areas may be formed by depositing the electrode layer on the transparent piezoelectric film layer and performing exposing and developing processes using a patterned mask. This patterning technique is a general technique, and thus a detailed description thereof is omitted. The pattern defining the plurality of transparent electrode areas may be formed on the transparent piezoelectric film layer by using a patterned film or a patterned mold. The electrode layer formed on the transparent piezoelectric film layer may be formed by using vacuum deposition, sputtering, a physical deposition method such as ion plating, a chemical deposition method, blush painting, a spray method, and the like. The area excluding the plurality of transparent electrode areas may be etched and removed. The etching may be a machining method using a chemical corrosive action, and nitric acid, hydrofluoric acid, sulfuric acid, phosphoric acid, acetic acid, picric acid sodium, and the like may be used as an etching solution.

If an electrode layer is formed by arranging a plurality of transparent electrodes having line shapes on a transparent piezoelectric film layer, a plurality of transparent piezoelectric film layers on which the electrode layer including the plurality of transparent electrodes having the line shapes is formed may be required to determine x, y coordinates of a touch area. In detail, first and second transparent piezoelectric film layers may be disposed so as to enable a plurality of transparent electrodes formed on the first transparent piezoelectric film layer to be orthogonal to a plurality of transparent electrodes formed on the second transparent piezoelectric film layer.

Figure 7:
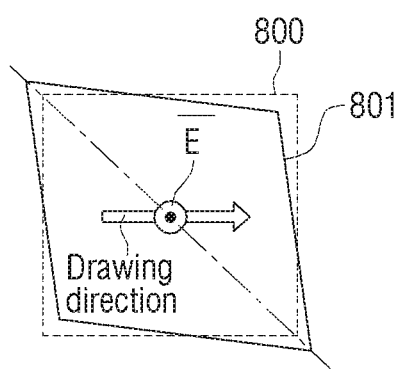
FIGS. 7, 8, and 9 illustrate transformed directions of a transparent piezoelectric film used in a touch pad according to an embodiment of the present disclosure.
Figure 8:
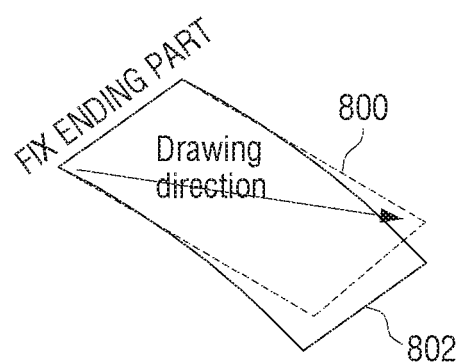
Figure 9:
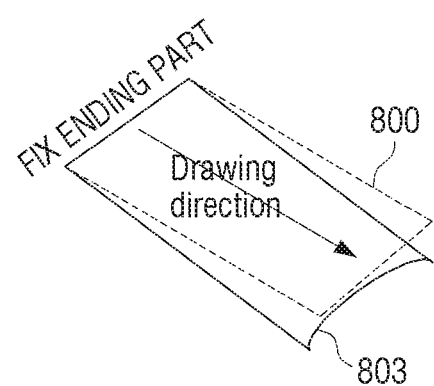

FIGS. 7 to 9 illustrate transformed directions of a piezoelectric film used in a touch pad according to an embodiment of the present disclosure. In detail, the piezoelectric film may be formed of a PLA material.

Referring to FIG. 7, if a voltage is applied to an edge of a piezoelectric film 800, a drawing direction of which is in an x-axis direction, a piezoelectric film 801 that is transformed in a form extending in a direction forming an angle of 45° with the drawing direction may be acquired by the voltage. The drawing direction refers to a direction of a force applied when unrolling a piezoelectric film roll if the piezoelectric film roll is produced. In other words, the drawing direction may be one selected from directions perpendicular to an axis of the piezoelectric film roll.

FIG. 8 illustrates a transformed shape of a piezoelectric film cut in a direction forming an angle of 45° with a drawing direction.

Referring to FIG. 8, if an edge of a piezoelectric film 800 cut in a direction forming an angle of 45° with a drawing direction is fixed, and then a voltage is applied to the edge of the piezoelectric film 800, an unfixed opposite edge of a piezoelectric film 802 that is transformed by a voltage may be transformed in a bending form bending down (or up).

FIG. 9 illustrates a transformed shape of a piezoelectric film cut in a drawing direction.

Referring to FIG. 9, if an edge of a piezoelectric film 800 cut in a drawing direction is fixed, and a voltage is applied to the edge of the piezoelectric film 800, both ends of an unfixed opposite edge of a piezoelectric film 803 that is transformed by a voltage may be transformed in a twist form twisting down (or up).

As described with reference to FIGS. 7 to 9, when a voltage is applied to a piezoelectric film, the piezoelectric film may be transformed in various shapes according to cutting directions. By using this, an electronic apparatus may differentiate magnitudes of touches and various types of touches such as a simply pressing touch, a pressing and twisting touch, and the like.

FIGS. 10 to 15 illustrate methods of stacking a plurality of transparent piezoelectric films used in a touch pad according to various embodiments of the present disclosure.

Figure 10:
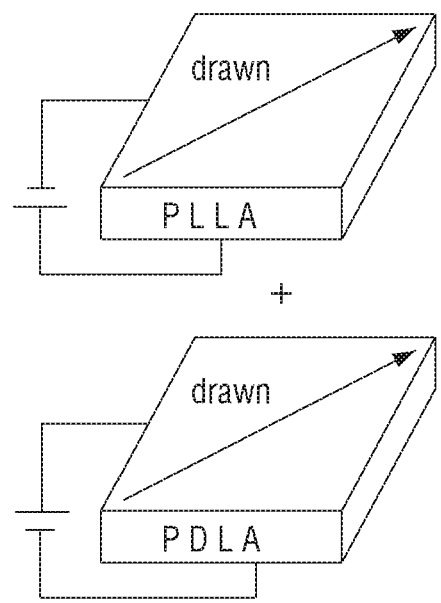
FIGS. 10, 11, 12, 13, 14, and 15 illustrate methods of stacking a plurality of transparent piezoelectric films used in a touch pad according to various embodiments of the present disclosure.
Figure 11:
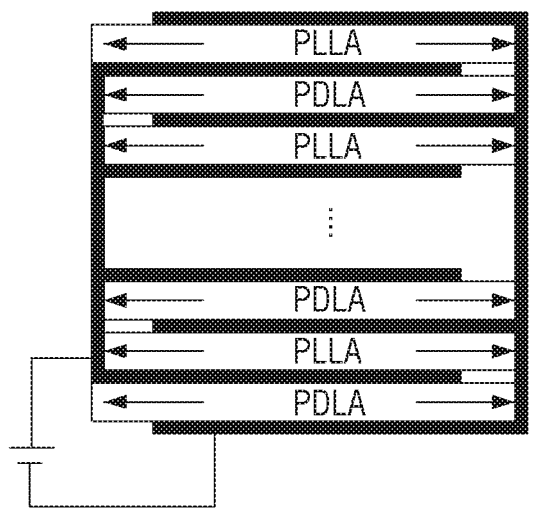

Referring to FIGS. 10 and 11, a method of forming a transparent piezoelectric film layer by cross-stacking a PLLA film and a PDLA film that are mirror image isomer, is illustrated.

Referring to FIG. 11, the transparent piezoelectric film layer may be formed by cross-stacking a plurality of PLLA films and a plurality of PDLA films. In detail, as shown in FIG. 10, in the transparent piezoelectric film layer, the PDLA film and the PLLA film may be stacked by matching drawing directions of the PDLA film and the PLLA film.

Therefore, a touch pressure sensing precision degree of the transparent piezoelectric film layer may be improved. In detail, although a small force is applied, a high voltage may be generated. Alternatively, although a low voltage is applied, many vibrations may be generated. Also, although a force pressing a touch screen is less changed, a change in a generated voltage may increase, and thus the electronic apparatus may determine a strength of a touch in several stages. According to another embodiment, if a touch pressure occurs on the touch screen, a strength of the touch pressure may be subdivided and acquired based on a plurality of film layers generating voltages and levels of the voltages respectively generated from the plurality of film layers.

FIGS. 12 to 15 illustrate methods of forming a transparent piezoelectric film layer by stacking a plurality of PLLA films.

Figure 12:
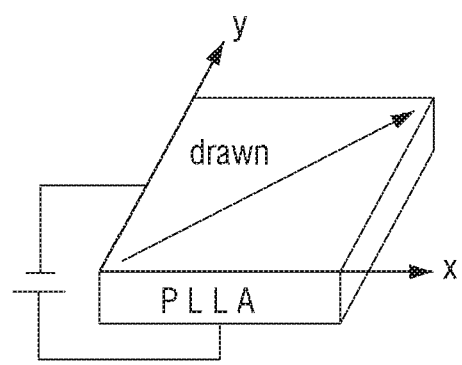
Figure 13:
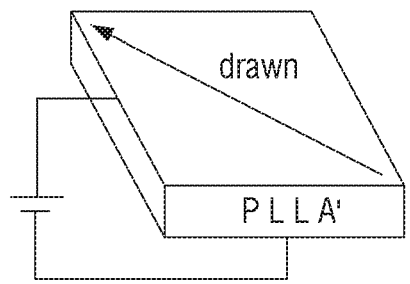
Figure 14:
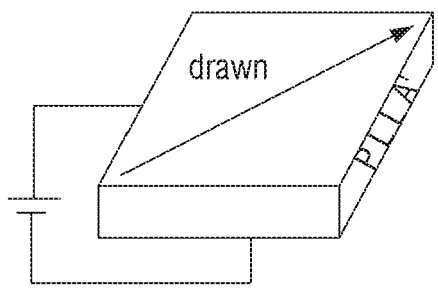

Referring to FIGS. 12 to 14, a method of matching drawing directions to stack the plurality of PLLA films is illustrated. "PLLA" described in the PLLA films of FIGS. 12 to 14 is described merely to indicate a kind and a direction of a piezoelectric film and thus may not be described.

Referring to FIG. 12, a drawing direction of a PLLA film may be located on xy plane where the PLLA film is placed. For example, if x axis is located in front of the transparent piezoelectric film layer on which "PLLA" is described, and y axis is located on one of both sides of the transparent piezoelectric film layer, a drawing direction of the PLLA film may be placed on xy plane.

If the PLLA film is overturned based on the y axis, a drawing direction of PLLA' film is symmetrical to the drawing direction of FIG. 12 based on the y axis as shown in FIG. 13.

If the PLLA' film shown in FIG. 13 is 90° rotated in a clockwise direction, the drawing direction of the PLLA' film of FIG. 13 corresponds to the drawing direction of the PLLA film of FIG. 12 as shown in FIG. 14.

For convenience of description, a PLLA film has been limitedly described as being overturned based on y axis and being 90° rotated in a clockwise direction so as to enable a drawing direction of the PLLA film to correspond to a drawing direction of another PLLA film. However, the PLLA film may be overturned based on x axis and then 90° rotated in a counterclockwise direction so as to enable the drawing direction of the PLLA film to correspond to the drawing direction of the another PLLA film, i.e., the PLLA film may be realized according to various methods.

Figure 15:
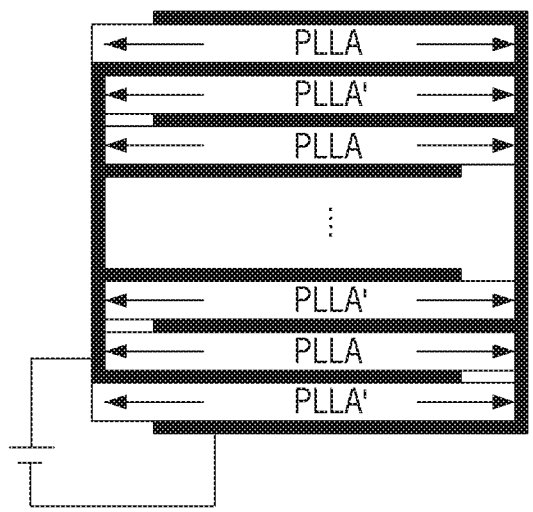

If the PLLA film of FIG. 12 and the PLLA' film of FIG. 14 are cross-stacked, a transparent piezoelectric film layer using a plurality of PLLA films may be formed as shown in FIG. 15.

For convenience of description, a side on which "PLLA" is described and a side on which "PLLA'" is described have been described as being located on the same side. However, the side on which "PLLA" is described may be located in front as shown in FIG. 12, and the side on which "PLLA'" is described may be located on a right side as shown in FIG. 14.

For convenience of description, merely a plurality of PLLA films have been limitedly illustrated and described as being stacked to form a transparent piezoelectric film layer in FIGS. 12 to 15. However, PDLA films may be stacked to form a transparent piezoelectric film layer according to the same method.

Therefore, a touch pressure sensing sensitivity of a transparent piezoelectric film layer may be improved. In detail, if a transparent piezoelectric film layer is formed by stacking a plurality of films, a level of a voltage of a generated electrical signal increases although the same force is applied, in comparison with a transparent piezoelectric film layer formed of one film. Therefore, a touch screen may sense a finer touch pressure and, if the same voltage is applied, may generate greater vibrations. Also, although a force pressing the touch screen is less changed, a change in a voltage of a generated electrical signal may increase, and thus the electronic apparatus may subside and determine a strength of a touch.

As described above, a magnitude of a touch pressure is determined by sensing a voltage of an electrical signal generated from a whole area of a transparent piezoelectric film layer formed by stacking a plurality of films. However, the magnitude of the touch pressure may be determined by sensing voltages of electrical signals respectively generated from a plurality of films forming a transparent piezoelectric film layer.

Various embodiments of the present disclosure as described above may provide an electronic apparatus capable of dividing and recognizing a strength of a touch and locally vibrating a touch area so as to reduce power consumption and capable of recognizing the touch performed by a weak pressing force due to an improvement of a sensitivity of the touch, thereby improving convenience of a user.

The electrode layer may include a plurality of transparent electrodes configured to be disposed in a matrix form in cell shapes on the transparent piezoelectric film layer.

The transparent piezoelectric film layer may include a first transparent piezoelectric film layer, and a second transparent piezoelectric film layer configured to be disposed on the first transparent piezoelectric film layer. The electrode layer may include a first electrode layer configured to include a plurality of transparent electrodes configured to be disposed in line shapes in a row on an upper surface of the first transparent piezoelectric film layer, and a second electrode layer configured to include a plurality of transparent electrodes configured to be disposed in line shapes in a row on an upper surface of the second transparent piezoelectric film layer. The plurality of transparent electrodes of the first electrode layer may be orthogonal to the plurality of transparent electrodes of the second electrode layer.

In response to a voltage being applied through at least one of the plurality of transparent electrodes of the electrode layer, the transparent piezoelectric film layer may generate a vibration corresponding to the applied voltage.

The transparent piezoelectric film layer may be formed of at least one selected from a poly-l-lactide Acid (PLLA) film, a poly-d-lactide Acid (PDLA) film, and a polyvinylidene fluoride (PVDF) film.

The transparent piezoelectric film layer may be formed by cross-stacking the PLLA film and the PDLA film.

The transparent piezoelectric film layer may be formed by stacking one of the PLLA film and the PDLA film.

The plurality of transparent electrodes may be formed of poly (3,4-ethylenedioxythiophene) (PEDOT), a carbon nano tube (CNT), or graphene.

According to another aspect of the present invention, a touch screen includes a display panel configured to display a screen, a touch pad configured to be disposed on the display panel, and a window cover configured to be disposed on the touch pad.

The processor may perform an operation corresponding to a level of the voltage based on the level of the voltage sensed through the plurality of transparent electrodes.

The forming of the electrode layer comprising the plurality of transparent electrodes may include depositing the electrode layer on the transparent piezoelectric film layer, forming a pattern defining the plurality of transparent electrodes on the deposited electrode layer, and etching an area except excluding the plurality of transparent electrodes.

The pattern may define the plurality of transparent electrodes so as to arrange a plurality of transparent electrodes having cell shapes in a matrix form on the transparent piezoelectric film layer.

The pattern may define the plurality of transparent electrodes so as to arrange a plurality of transparent electrodes having line shapes in a row on the transparent piezoelectric film layer.

The providing of the transparent piezoelectric film layer may further include providing a first transparent piezoelectric film layer and a second transparent piezoelectric film layer, and arranging the first and second transparent piezoelectric film layers so as to enable the plurality of transparent electrodes formed on the first transparent piezoelectric film layer to be orthogonal to the plurality of transparent electrodes formed on the second transparent piezoelectric film layer.

The transparent piezoelectric film layer may be formed of at least one selected from a PLLA film, a PDLA film, and a PVDF film.

The providing of the transparent piezoelectric film layer may include cross-stacking the PLLA film and the PDLA film.

The providing of the transparent piezoelectric film layer may include stacking one of the PLLA film and the PDLA film.

The plurality of transparent electrodes may be formed of PEDOT, a CNT, or graphene.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A touch pad comprising:
a first transparent piezoelectric film layer; and
a first electrode layer comprising a plurality of transparent electrodes disposed on a plurality of areas of the first transparent piezoelectric film layer,
wherein the first electrode layer comprises:
a plurality of first transparent electrodes configured to sense a voltage generated by a touch pressure on the first transparent piezoelectric film layer, and
a plurality of second transparent electrodes configured to apply a second voltage to the first transparent piezoelectric film layer, and
wherein the plurality of first transparent electrodes are disposed on an upper surface of the first transparent piezoelectric film layer and the plurality of second transparent electrodes are disposed on the upper surface of the first transparent piezoelectric film layer, and
wherein the plurality of first transparent electrodes and the plurality of second transparent electrodes are disposed in line shapes in the same direction in a row on the upper surface of the first transparent piezoelectric film layer.

2. The touch pad of claim 1, wherein the plurality of first transparent electrodes and the plurality of second transparent electrodes within the first electrode layer are configured to be disposed in a matrix form in cell shapes on the upper surface of the transparent piezoelectric film layer.

3. The touch pad of claim 1, further comprising:
a second transparent piezoelectric film layer disposed on the first transparent piezoelectric film layer, and
a second electrode layer comprising a plurality of transparent electrodes disposed on a plurality of areas of the second transparent piezoelectric film layer,
wherein the second electrode layer comprises:
a plurality of third transparent electrodes configured to sense a voltage generated by a touch pressure on the second transparent piezoelectric film layer, and
a plurality of fourth transparent electrodes configured to apply a second voltage to the second transparent electrode film layer,
wherein the plurality of third transparent electrodes and plurality of fourth transparent electrodes disposed in line shapes in a row on an upper surface of the second transparent piezoelectric film layer,
and
wherein the plurality of first transparent electrodes and plurality of second transparent electrodes of the first electrode layer are orthogonal to the plurality of third transparent electrodes and plurality of fourth transparent electrodes of the second electrode layer.

4. The touch pad of claim 1, wherein, in response to a voltage being applied through at least one of the plurality of second transparent electrodes of the first electrode layer, the first transparent piezoelectric film layer generates a vibration corresponding to the applied voltage.

5. The touch pad of claim 1, wherein the first transparent piezoelectric film layer is formed of at least one selected from a poly-l-lactide acid (PLLA) film, a poly-d-lactide (PDLA) film, and a polyvinylidene fluoride (PVDF) film.

6. The touch pad of claim 5, wherein the first transparent piezoelectric film layer is formed by cross-stacking the PLLA film and the PDLA film.

7. The touch pad of claim 5, wherein the first transparent piezoelectric film layer is formed by stacking one of the PLLA film and the PDLA film.

8. The touch pad of claim 1, wherein the plurality of first transparent electrodes and the plurality of second transparent electrodes are formed of poly (3,4-ethylenedioxythiophene) (PEDOT), a carbon nano tube (CNT), or graphene.

9. An electronic apparatus comprising:
a touch screen comprising:
a display panel configured to display a screen,
a touch pad disposed on the display panel, the touch pad comprising:
a transparent piezoelectric film layer, and
an electrode layer comprising a plurality of transparent electrodes disposed on a plurality of areas of the transparent piezoelectric film layer, and
a window cover disposed on the touch pad; and
a processor configured to determine a location to which touch pressure is applied, based on a voltage sensed through a plurality of transparent electrodes,
wherein the plurality of transparent electrodes comprises:
a plurality of first transparent electrodes configured to sense a voltage generated by a touch pressure on the transparent piezoelectric film layer, and
a plurality of second transparent electrodes configured to apply a second voltage to the transparent piezoelectric film layer, and
wherein the plurality of first transparent electrodes are disposed on an upper surface of the first transparent piezoelectric film layer and the plurality of second transparent electrodes are disposed the upper surface of the transparent piezoelectric film layer, and
wherein the plurality of first transparent electrodes and the plurality of second transparent electrodes are disposed in line shapes in the same direction in a row on the upper surface of the first transparent piezoelectric film layer.

10. The electronic apparatus of claim 9, wherein the processor is further configured to perform an operation corresponding to a level of the voltage based on the level of the voltage sensed through the plurality of transparent electrodes.

11. A method of producing a touch pad, the method comprising:
providing a first transparent piezoelectric film layer; and
forming a first electrode layer comprising a plurality of transparent electrodes disposed on a plurality of areas of the first transparent piezoelectric film layer,
wherein the first electrodes layer comprises:
a plurality of first transparent electrodes configured to sense a voltage generated by a touch pressure on the first transparent piezoelectric film layer, and
a plurality of second transparent electrodes configured to apply a second voltage to the first transparent piezoelectric film layer, and
wherein the plurality of first transparent electrodes are disposed on an upper surface of the first transparent piezoelectric film layer and the plurality of second transparent electrodes are disposed on the upper surface of the first transparent piezoelectric film layer, and
wherein the plurality of first transparent electrodes and the plurality of second transparent electrodes are disposed in line shapes in the same direction in a row on the upper surface of the first transparent piezoelectric film layer.

12. The method of claim 11, wherein the forming of the first electrode layer comprising the plurality of transparent electrodes comprises:
depositing an electrode layer on the first transparent piezoelectric film layer;
forming a pattern defining the plurality of first transparent electrodes and the plurality of second transparent electrodes on the deposited electrode layer; and
etching an area excluding the plurality of first transparent electrodes and the plurality of second transparent electrodes.

13. The method of claim 12, wherein the pattern defines the plurality of first transparent electrodes and the plurality of second transparent electrodes so as to arrange the plurality of first transparent electrodes and the plurality of second transparent electrodes to have cell shapes in a matrix form on the first transparent piezoelectric film layer.

14. The method of claim 12, wherein the pattern defines the plurality of first transparent electrodes and the plurality of second transparent electrodes so as to arrange the plurality of first transparent electrodes and the plurality of second transparent electrodes to have line shapes in a row on the first transparent piezoelectric film layer.

15. The method of claim 14, further comprising:
providing a second transparent piezoelectric film layer;
forming a second electrode layer comprising:
a plurality of third transparent electrodes configured to sense a voltage generated by a touch pressure on the second transparent piezoelectric film layer, and
a plurality of fourth transparent electrodes configured to apply a second voltage to the second transparent electrode film layer,
wherein the plurality of third transparent electrodes and the plurality of fourth transparent electrodes disposed in line shapes in a row on an upper surface of the second transparent piezoelectric film layer; and
arranging the first transparent piezoelectric film layer and the second transparent piezoelectric film layer so as to enable the plurality of first transparent electrodes and the plurality of second transparent electrodes formed on the first transparent piezoelectric film layer to be orthogonal to the plurality of third transparent electrodes and the plurality of fourth transparent electrodes formed on the second transparent piezoelectric film layer.

16. The method of claim 11, wherein the first transparent piezoelectric film layer is formed of at least one selected from a poly-l-lactide acid (PLLA) film, a poly-d-lactide acid (PDLA) film, and a polyvinylidene fluoride (PVDF) film.

17. The method of claim 16, wherein the providing of the first transparent piezoelectric film layer comprises cross-stacking the PLLA film and the PDLA film.

18. The method of claim 16, wherein the providing of the first transparent piezoelectric film layer comprises stacking one of the PLLA film and the PDLA film.

19. The method of claim 11, wherein the plurality of first transparent electrodes and the plurality of second transparent electrodes are formed of poly (3,4-ethylenedioxythiophene) (PEDOT), a carbon nano tube (CNT), or graphene.

* * * * *